(12) United States Patent
Limpaitoon

(10) Patent No.: US 8,585,141 B2
(45) Date of Patent: Nov. 19, 2013

(54) LUMBAR SUPPORT DEVICE

(75) Inventor: Tongchai Limpaitoon, Samutprakarn (TH)

(73) Assignee: Srithai Autoseats Industry Company Limited, Samutprakarn (TH)

( * ) Notice: Subject to any disclaimer, the term of this patent is extended or adjusted under 35 U.S.C. 154(b) by 129 days.

(21) Appl. No.: 13/247,406

(22) Filed: Sep. 28, 2011

(65) Prior Publication Data
US 2013/0076091 A1 Mar. 28, 2013

(51) Int. Cl.
A47C 7/42 (2006.01)
(52) U.S. Cl.
USPC .............. 297/230.1; 297/230.12; 297/230.13; 297/230.14; 297/284.5; 297/284.6
(58) Field of Classification Search
USPC .............. 297/230.1, 230.11, 230.12, 230.13, 297/230.14, 284.5, 284.6
See application file for complete search history.

(56) References Cited

U.S. PATENT DOCUMENTS

| | | | | |
|---|---|---|---|---|
| 4,143,909 A * | 3/1979 | McFarlin | ............... | 297/230.1 X |
| 4,467,484 A | 8/1984 | Nagatake et al. | | |
| 4,516,568 A * | 5/1985 | Baxter et al. | ......... | 297/230.14 X |
| 4,518,200 A * | 5/1985 | Armstrong | ................ | 297/284.6 |
| 4,597,386 A * | 7/1986 | Goldstein | ............ | 297/230.13 X |
| 4,789,202 A * | 12/1988 | Alter | ............ | 297/284.6 |
| 4,793,651 A | 12/1988 | Inagaki et al. | | |
| 4,807,931 A | 2/1989 | Ishida et al. | | |
| 4,862,536 A * | 9/1989 | Pruit | ............ | 297/284.5 |
| 5,054,854 A * | 10/1991 | Pruit | ....... | 297/284.6 X |
| 5,314,235 A * | 5/1994 | Johnson | ..................... | 297/284.5 |
| 5,433,505 A * | 7/1995 | Coyne et al. | ......... | 297/230.14 X |
| 5,637,076 A | 6/1997 | Hazard et al. | | |
| 5,863,095 A * | 1/1999 | Rivard et al. | ............. | 297/230.13 |
| 6,659,552 B2 * | 12/2003 | Duncan | ...................... | 297/230.1 |
| 6,929,325 B1 * | 8/2005 | Goelo | .................... | 297/284.6 X |
| 7,237,848 B1 * | 7/2007 | Story et al. | .......... | 297/230.14 X |
| 7,270,377 B2 * | 9/2007 | Schmitz et al. | ........ | 297/230.1 X |
| 7,621,596 B2 * | 11/2009 | Petzel | ............ | 297/284.6 |
| 7,703,849 B2 * | 4/2010 | Bilak et al. | ................ | 297/284.6 |
| 8,147,000 B1 * | 4/2012 | Drake | .................... | 297/284.6 X |
| 8,398,170 B2 * | 3/2013 | Walker | ................... | 297/284.6 X |
| 2002/0180249 A1 * | 12/2002 | Felton et al. | ............... | 297/284.6 |
| 2008/0001452 A1 * | 1/2008 | Schmitz et al. | ........... | 297/284.6 |
| 2008/0164734 A1 * | 7/2008 | Nile et al. | ................ | 297/230.13 |
| 2008/0315644 A1 * | 12/2008 | Briscoe | ..................... | 297/230.1 |
| 2009/0236888 A1 * | 9/2009 | Chew | ........................ | 297/284.5 |
| 2010/0078977 A1 * | 4/2010 | Glyck | ....................... | 297/230.14 |
| 2011/0133524 A1 * | 6/2011 | Cheng | .................. | 297/230.13 X |
| 2012/0112506 A1 * | 5/2012 | Glyck | ........................ | 297/230.1 |

* cited by examiner

Primary Examiner — Rodney B White
(74) Attorney, Agent, or Firm — Murabito, Hao & Barnes LLP; Andrew D. Fortney

(57) ABSTRACT

Disclosed is a back supporting device for use with seating apparatuses. The back support device includes a bag containing at least one compartment holding a predetermined amount of fluid, liquid or gel, a flexible cover encasing the bag, and fastening elements for securing the device to the seating apparatus. The device is secured to a seating apparatus to secure the device in place. The fluid, liquid or gel inside the compartment is able to move in response to an application of pressure. When seated, the person's back presses against the device, in particular, the fluid, liquid or gel in the bag, causing the substance inside the bag to move in multiple directions in response to the movement of the person, thereby providing support and at the same time inducing muscle movement and reducing muscle fatigue in the back of the person, in particular in the lumbar region.

22 Claims, 7 Drawing Sheets

LUMBAR SUPPORT DEVICE

FIELD OF THE INVENTION

The present invention relates to a back support device. More particularly, the invention relates to a device for use with a seating apparatus such as office chair, automotive vehicle seat, etc., to provide back support, in particularly, to the lumbar region for the user.

DISCUSSION OF THE BACKGROUND

After an extended period of sitting, muscle fatigue or muscle pain in the lower back region is very common. Many individuals resort to various kinds of back supports. One of the most common forms of a back support is a pillow filled with synthetic fibers, foam beads or avian plumage. Over time, improvements to back support apparatuses have been developed. For example:

U.S. Pat. No. 4,467,484 discloses a pneumatic cushion fabricated from two sheets of expandable materials, welded together to define an expandable pneumatic chamber. The welded portion is separated from the pneumatic chamber by a rigid board. The board is positioned on one side of the pneumatic chamber. The welded portion is located behind the board so that the circumferential edge thereof and the portion chamber wall sheet mating to the circumferential edge of the board serve as insulating means for insulating the welded portion from tension forces applied to the pneumatic chamber as a result of increasing air pressure.

U.S. Pat. No. 4,793,651 discloses a seat cover for an automotive vehicle which has inflatable, transversely extending columnar portions with inflatable portions providing support to the seated individual, and heat retaining portions, filled with a heat retaining agent interposed among the inflatable columnar portions for accumulating ambient heat derived from sunlight and for giving off heat when the ambient temperature drops.

U.S. Pat. No. 4,807,931 discloses an air-controlled lumbar support apparatus for a vehicle seat having a base member and a backrest. The backrest includes an inflatable chamber, a valve mechanism and a pneumatic tube. The inflatable chamber mounted within the backrest and includes at least one partition disposed across a substantial portion of the inflatable chamber. The valve mechanism receives and discharges a flow of pressurized fluid. The pneumatic tube interconnects the valve mechanism and the inflatable chamber for transferring the flow of pressurized fluid. A pump is attached to the valve mechanism for injecting fluid through the valve mechanism and the pneumatic tube to inflate the inflatable chamber. A switching mechanism allows for the release of fluid out of the valve mechanism, thereby deflating the inflatable chamber, as desired.

U.S. Pat. No. 5,637,076 discloses an apparatus for cycling the lower back through a range of lordosis. The apparatus includes a static structure adjacent to the back of a person and a force applying apparatus disposed between the static structure and the back of a person. The force applying apparatus includes a back engaging surface cyclically movable to increase and decrease static structure and the back engaging surface so as to cycle the lower back through the range of lordosis.

The disadvantages of the aforementioned back support devices are that they tend to be relatively complicated in their components and structures, thus making production relatively complicated and potentially costly. More particularly, all of these back support devices are believed to be embedded inside the backrest of the automotive vehicle seat, and in at least some embodiments, the driver's seat. As a result, it is challenging to immobilize the device in a different seating unit. In addition, the installation and maintenance of such back support devices may require professional help or may need to be pre-assembled from the seating apparatus production site.

Therefore, it is an object of the invention to provide a back supporting device that is relatively simple in its structure, thus enabling lower manufacturing costs, that is portable (e.g., that can be moved to a different seating unit as desired), that is easy to install and maintain, while providing efficient back support. The object(s) of the invention may be achieved by the device having the characteristics recited in the independent claims.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY OF THE INVENTION

The invention disclosed herein concerns a back supporting device for use with seating apparatuses. The present back support device may comprise a bag, having a shape corresponding to the general shape of a person's back, the bag comprising at least one compartment holding a predetermined amount of fluid or gas; a flexible cover encasing the bag, and fastening elements for securing the device to the seating apparatus. The edge of the bag is sealed or stitched to the cover, thereby holding the bag in place. The fluid inside the compartment may move in multiple directions in response to the application of pressure or weight from a person leaning against or pressing upon the seating apparatus backrest. The device can be secured to a seating apparatus to secure the device in place using the fastening elements. When seated, the person's back (preferably, the lumbar region) presses against the device (preferably, the fluid or gas contained in the bag), causing the contents of the bag to move in multiple directions in response to pressure applied by the person or movement of the person, thereby providing support and at the same time inducing muscle movement or massaging the person's back, thereby reducing muscle fatigue, preferably in the lumbar region.

These and other advantages of the present invention will become readily apparent from the detailed description of various embodiments below.

BRIEF DESCRIPTION OF THE DRAWINGS

Details of the invention and of a preferred embodiment thereof will be better understood by reference to the drawings in which.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Figure 1:
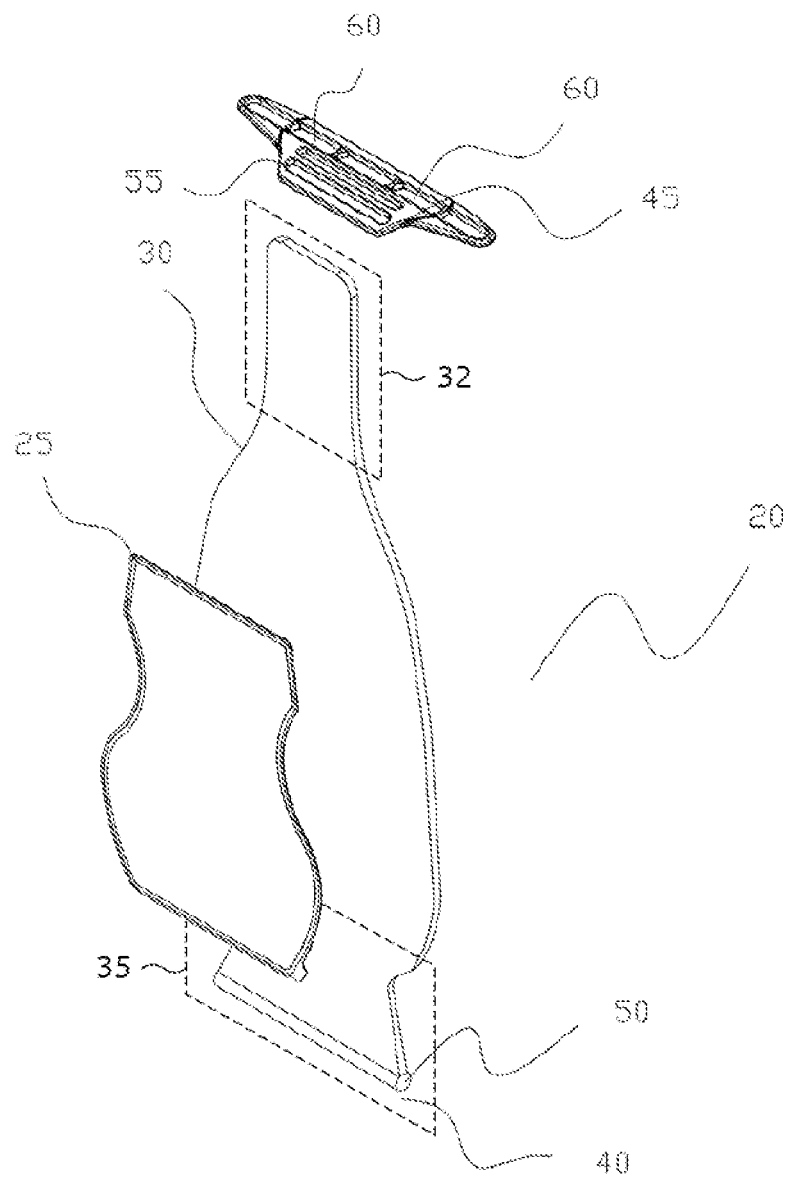
FIG. 1 shows a perspective exploded view of an embodiment of the lumbar support device according to one aspect of the invention.

The invention relates to a back support device, and preferably, a device for supporting a lumbar region of the lower back, which may be referred to as "a lumbar support device" 20 (FIG. 1). The lumbar support device 20 according to one aspect of the invention may comprise a bag 25, comprising at least one compartment holding a predetermined amount of fluid or gas, a flexible cover 30 encasing the bag 25, and fastening elements for securing the device to a seating apparatus. As shown in FIG. 1, the bag 25 has a shape corresponding to a general shape of a person's back, preferably having one or more larger dimensions toward the bottom of the support device 20 or toward the lower back of the person to correspond with a shape of a person's back, as well as to control movement of the content inside the bag 25. Thus, in some embodiments, the lumbar support device 20 may have a lower half with a width that is greater than a corresponding width in the upper half, the corresponding width being measured from a horizontal axis across the center of the lumbar support device 20. In some cases, the corresponding width in the upper half of the lumbar support device 20 may be equal to the width of the lumbar support device 20 at some points in the lower half of the lumbar support device 20.

A predetermined volume of fluid or gas ranging from 500 cc to 3000 cc is placed or deposited inside the bag 25. In general, the volume of fluid or gas is sufficient to enable movement of the fluid or gas in multiple directions in response to the application of pressure or weight from a person leaning against or pressing upon the backrest of a seating apparatus having the lumbar support device 20 secured thereon, yet provide support to the person's back, preferably in the lumbar region. Preferably, the volume of the fluid or gas should be less than the maximum or potential maximum volume of the bag 25 so that the fluid or gas can move inside the bag 25 when pressure is applied against the bag 25. From experiments and tests performed by the inventor, it has been found that in one exemplary example, for a bag having a dimension of 306 mm wide and 411 mm long, an optimum volume of fluid or gas to be deposited or placed inside the bag 25 is when the bag reaches 10-40 mm in height when filling the bag with the fluid or gas while the bag is lying horizontally (e.g., on a flat surface). The bag 25 is tightly sealed along the edge or seam of the bag 25 to contain the fluid or gas deposited or placed therein. Preferably, the fluid or gas is selected from either oxygen or nitrogen gas. Alternatively, the fluid or gas may comprise oxygen or nitrogen gas (e.g., air), water (e.g., a water-based gel material) or a silicone, or consist essentially of air.

The bag 25 is securely placed inside a flexible cover 30 concealing the bag 25 therein. The cover 30 may be made of one or more natural or synthetic materials, such as fabric, genuine leather, artificial leather, rubber, vinyl or any other composite or laminate materials. Preferably, the cover is durable and resistant to tears and/or punctures. The cover 30 may include decorative markings, textures, patterns, graphics, pictures, drawings, logos or trademarks or the like. The cover 30 has a general shape corresponding to the shape of the bag 25, and may be made as a single piece or as two or more separate pieces stitched together around the edge(s). The bag 25 may be securely placed inside the cover 30 by, for example, stitching or sealing the edge of the bag 25 to the cover 30 to keep the bag 25 in position. In one embodiment, as shown in FIG. 1, one end 32 of the cover 30, further and away from where the bag 25 is located, has an extended portion forming a long strip similar to a large belt, while the opposite end 35 also has an extended portion of which wider toward its end, similar to a bell shape. The bell shaped end 35 may have a folded and stitched portion at the very end to form an insert 40.

Figure 2:
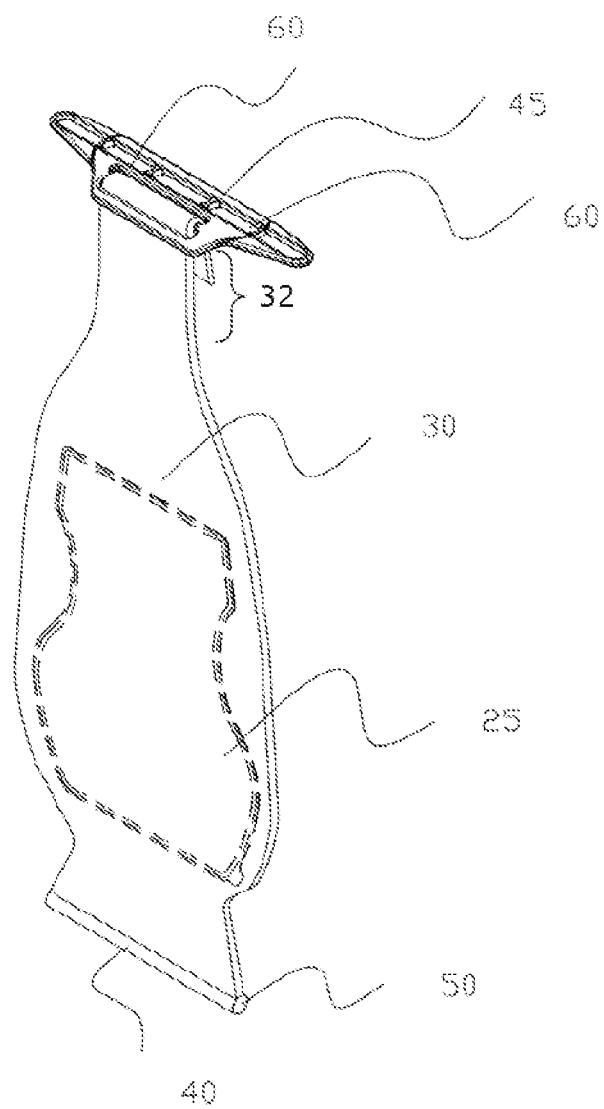
FIG. 2 shows a perspective view of a complete assembly of the lumbar support device of FIG. 1.

Fastening elements are engaged to the cover 30 of the device to secure the device to the seating apparatus. As shown in FIG. 1, the fastening element may be realized in the form of a buckle 45 for receiving engagement with the belt like end 32 of the cover 30 and a rod (or dowel) 50 inserted into the insert 40 of the bell like end 35 of the cover 30. This embodiment of the back support device is designed for use with a seating apparatus that includes a removable headrest, and more specifically, for a seating apparatus with a headrest having two or more supporting pins or posts. As shown in FIG. 1 and FIG. 2, the buckle 45 has a fastening arm 55 wherein the belt like end 32 of the cover 30 is fastened thereon or placed or looped thereover to hold the device in a vertical position. The buckle 45 may further contain multiple spaced-apart through holes 60. Preferably, the distance between the through holes 60 and the diameter of the through holes 60 correspond to the distance and diameter of the pins or posts of the removable headrest of the seating apparatus (such as a driver's or passenger seat of a car), such that each pin or post of the headrest engages with respective holes 60 in the buckle 45. The rod 50 may be inserted into the insert 40 of the bell like end 35 of the cover 30, and may be realized as a foam, rubber, plastic or wooden rod or dowel for engaging with the seating apparatus holding the device 20 in position. In one exemplary example, the insert 40 is pushed through a small space or gap between the seat and the backrest of a seating apparatus (such as a driver's seat of an automotive vehicle). The rod 50 is then inserted into the insert 40. The thickness of the rod 50 should be larger than the space between the seat and the back rest of the seating apparatus, enabling the bell like end 35 of the cover 30 to be fixed or locked in position behind and/or between the seat and the back rest.

Figure 3:
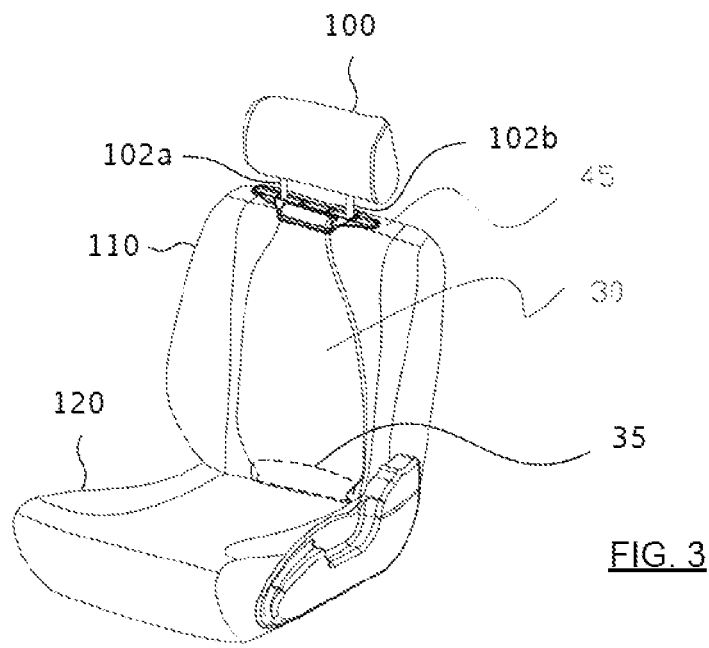
FIG. 3 shows a perspective view of an arrangement of the lumbar support device of FIG. 1 on a seating apparatus.
Figure 4:
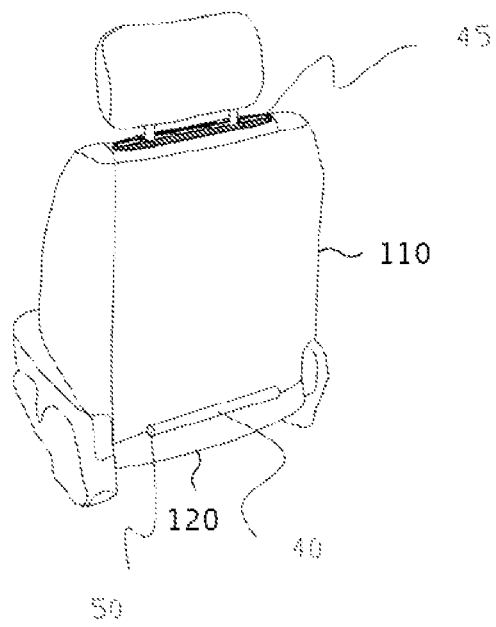
FIG. 4 shows a perspective view of the arrangement of the lumbar support device of FIG. 3 from the back of the seating apparatus.

In use, as shown in FIG. 2 and FIG. 3, the belt like end 32 is fastened to the buckle 45 by securing the end 32 to the securing arm 55 of the buckle 45. The buckle 45 is subsequently secured to the headrest of the seating apparatus (such as the driver's or passenger seat) with a removable headrest by inserting the pins or posts 102a-102b of the headrest 100, directing each pin 102a and 102b into respective through holes 60 in the buckle 45, thereby restricting the buckle 45 to stay between the headrest 100 and the top of the backrest 110. As shown in FIG. 3 and FIG. 4, the insert 40 is pushed through a small space between the seat 120 and the backrest 110 of the seating apparatus. The rod 50 then inserted into the insert 40, holding the lower section 35 of the cover in position. By securing each end of the cover 30 to the seating apparatus, the device 20 is firmly held in position, restricting displacing of the device 20 while in use.

Figures 5A, 5B:
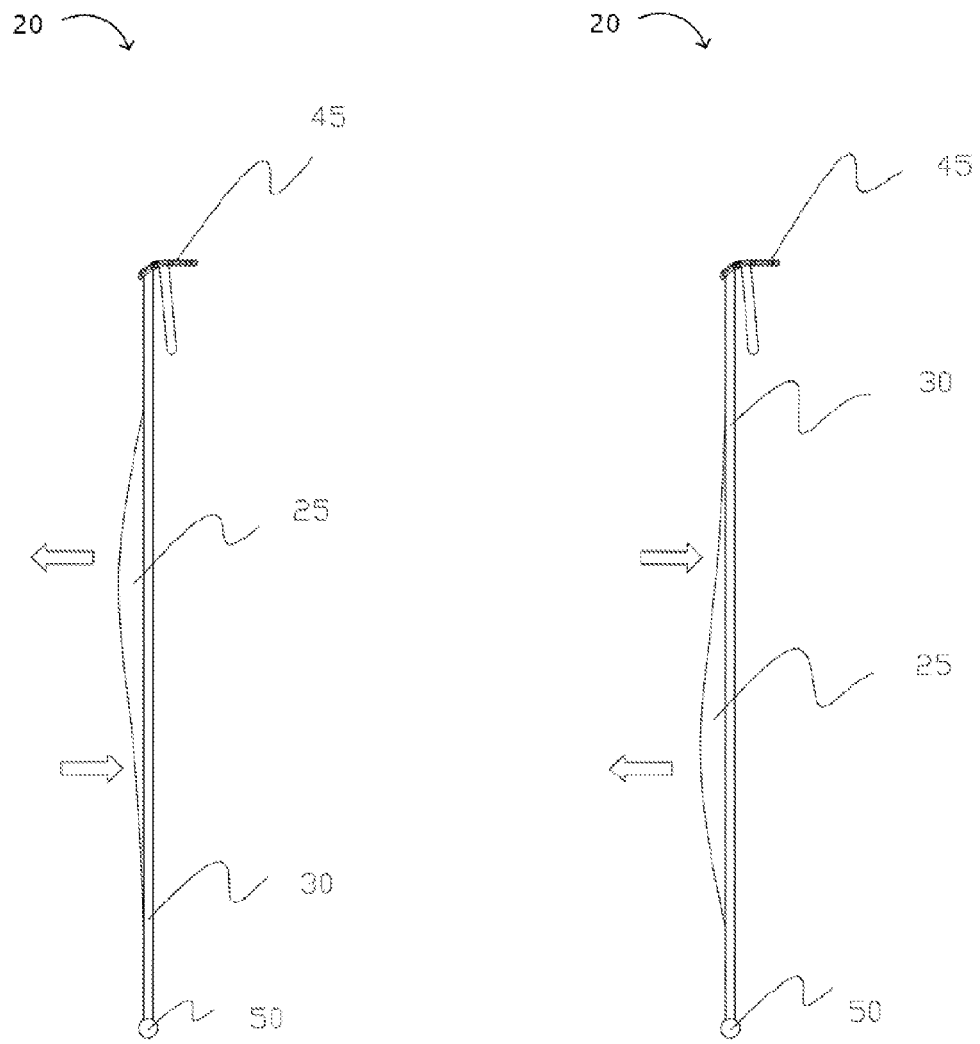
FIG. 5A shows a side view of the lumbar support device of FIG. 2, illustrating movement of the fluid, gas, liquid or gel inside the bag.
FIG. 5B shows a side view of the lumbar support device of FIG. 2, illustrating an alternative movement of the fluid, gas, liquid or gel inside the bag.

As shown in FIGS. 5A and 5B, once a person is seated and is leaning against the backrest of the seating apparatus, the device 20 is positioned between the person's back and the backrest of the seating apparatus. As the person leans against the backrest, pressure is applied against the device, and the fluid or gas inside the bag 25 moves in multiple directions in response to the movement of the person, thereby providing support and inducing muscle movement in the person's back while driving or seated, thereby reducing muscle ache and pain while in a prolonged sitting position.

Figure 6:
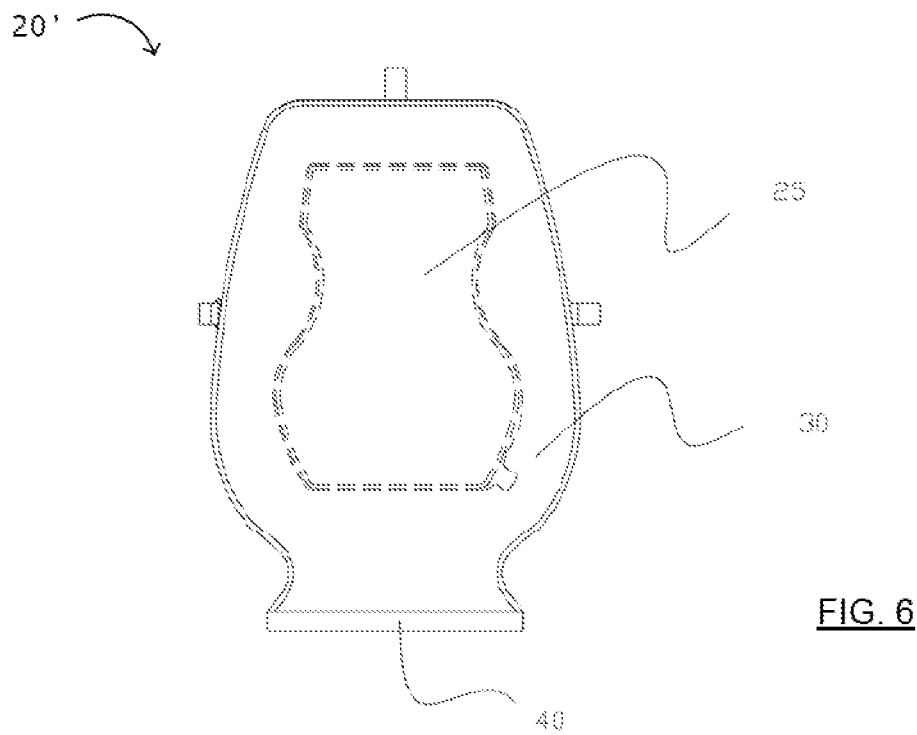
FIG. 6 shows a front view of another embodiment of the lumbar support device according to the invention.
Figure 7:
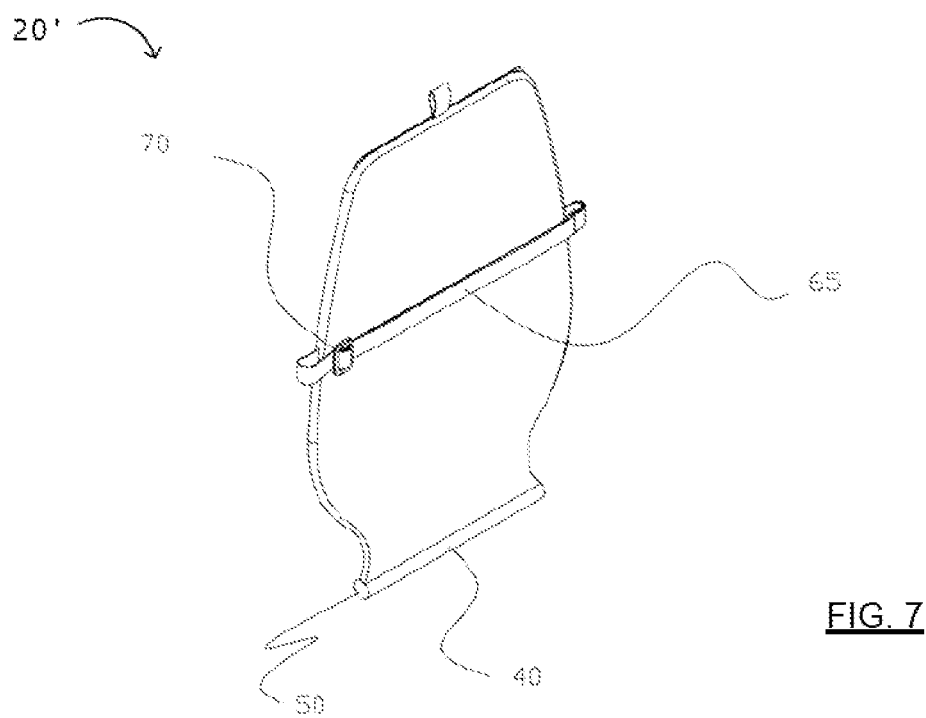
FIG. 7 shows a back perspective view of the lumbar support device of FIG. 6.
Figure 8:
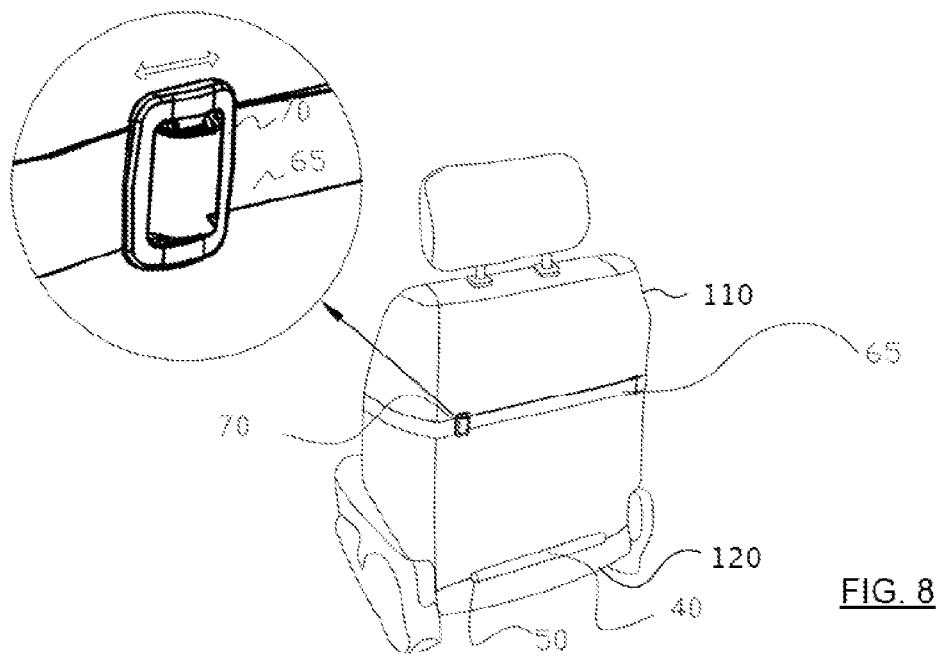
FIG. 8 shows a perspective view of an arrangement of the lumbar support device of FIG. 6 with a seating apparatus.
Figure 9:
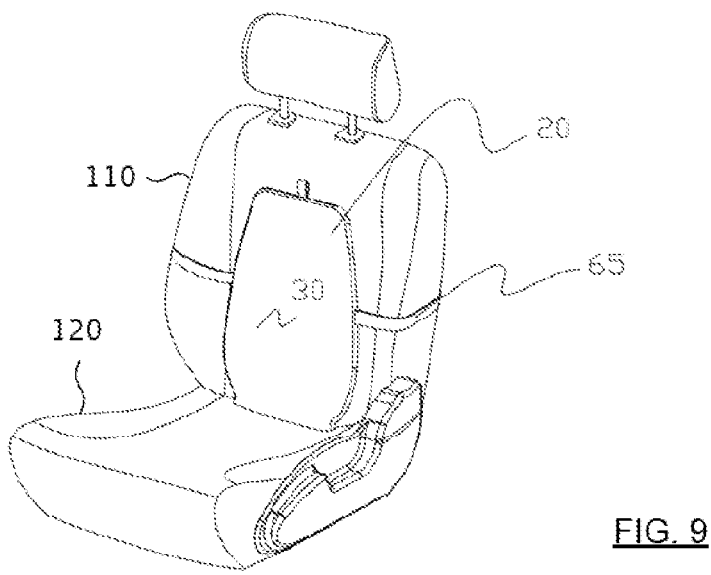
FIG. 9 shows a front perspective view of the lumbar support device of FIG. 8 on the seating apparatus.
Figure 10:
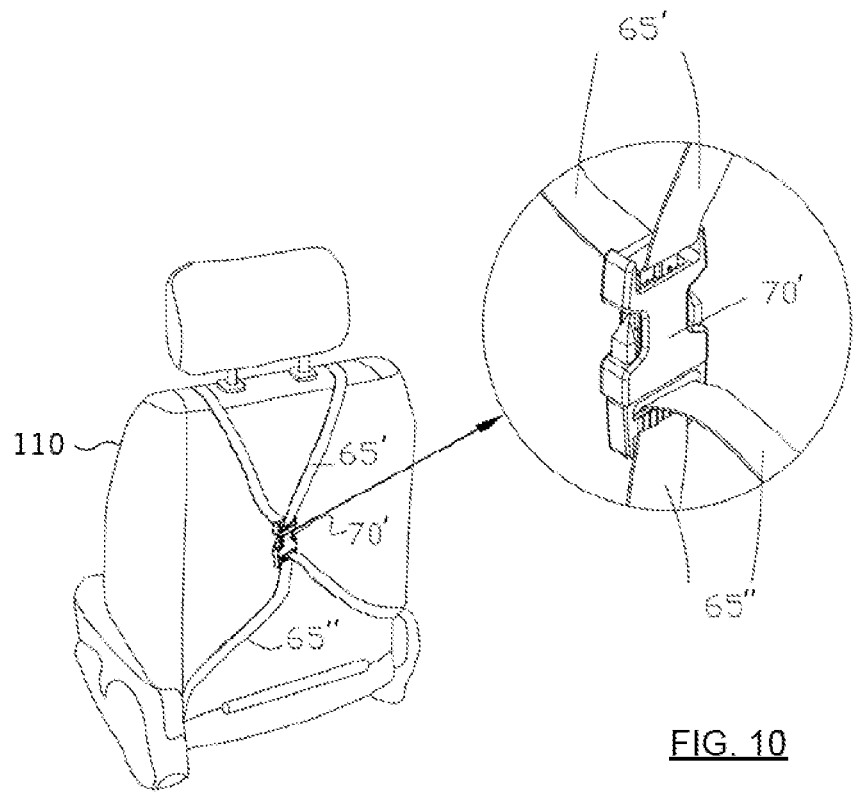
FIG. 10 shows a back perspective view of a further embodiment of the lumbar support device according to the invention.

An alternative method or mechanism for securing the device to the seating apparatus other than the buckle 45 and the rod 50 inside the insert 40 as earlier described may be provided. Accordingly, the fastening element for securing the lumbar support device to the seating apparatus in order to hold the device in position may comprise or be of another form adapted to serve the same or similar function. In addition, the shape and configuration of the bag 25 and/or the cover 30 may also be changed appropriately to meet such purposes. For example, FIG. 6 and FIG. 10 show alternative embodiments of fastening elements, realized as at least one adjustable strap 65 (FIG. 7) or a combination of at least one adjustable strap 65 with the insert 40 and rod 50 (FIGS. 7-8). The strap 65 provided on or fastened to the cover 30 may have a length that can be adjusted using a common buckle 70 or other type of fastener or stopper (not shown) available in the market, such as hook-and-loop type (e.g., Velcro®) fasteners, clasp type fasteners, etc. Using the buckle 70 or other fastener or stopper, the strap 65 may be fastened or loosened in order to fit the device 20' to or remove the device 20' from the seating apparatus.

FIGS. 7 and 8 show both an alternative shape of the cover 30 as well as an alternative form of fastening element. In this embodiment, the buckle 45 is not provided. Accordingly, the belt like end 32 of the cover 30 is also not provided. Instead, in this embodiment, the lumbar support device 20' is fitted or prepared with an adjustable strap 65 as shown in FIGS. 6-7. The adjustable strap 65 is fastened or secured to opposed sides (e.g., left and right sides) of the lumbar support device 20', approximately at or around the middle (as viewed along a lengthwise axis) of the device 20'. The strap 65 is provided with a buckle 70 for adjusting the length of the strap 65. In use, the strap 65 is fastened around the backrest 110 of the seating apparatus, securing the device 20' to the backrest 110 as shown in FIG. 8. The rod 50 is inserted into the insert 40, in turn positioned between the backrest 110 and the seat 120 as described above.

Figure 11:
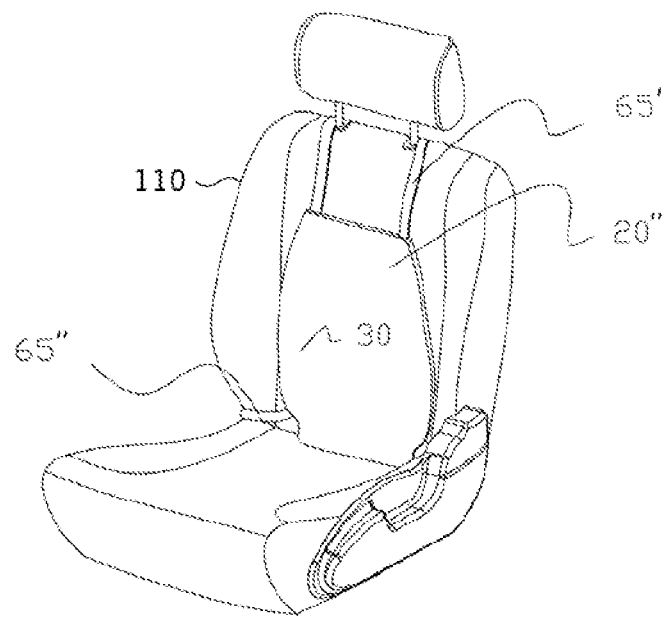
FIG. 11 shows a front perspective view of the lumbar support device according to the embodiment of FIG. 10.

FIGS. 10 and 11 show another embodiment of fastening elements for the lumber support device and an alternative arrangement of the lumber support device with the seating apparatus. In this embodiment, a strap 65' is provided on the upper section of the device 20''', and another strap 65'' is provided on the lower section of the device 20'''. Each of the straps 65' and 65'' forms a loop. For example, the strap 65' on the upper section of the device 20''' forms a loop by stitching one end of the strap 65' to the left side of the cover 30 and another end to the right side of the cover 30. The strap 65'' on the lower section of the cover is formed into a loop in a similar manner. One of the straps 65' and 65'' is fitted with a male clip-lock and the other of the straps 65' and 65'' is fitted with a complementary female clip-lock. The strap 65' on the upper section encircles the upper section of the backrest 110, while the strap 65'' on the lower section encircles the backrest 110 via its sides. The straps 65' and 65'' meet at the back of the backrest 110 and are locked together using the clip-lock 70' to fasten the device 20''' to the backrest 110 of the seating apparatus, thereby holding the device 20''' in place.

Further embodiments of the fastening element may be realized as one or more elastic bands (not shown) attached to opposed sides of the cover 30, or as a seat slip cover (not shown) having the bag fastened inside the lumbar support device (e.g., using a sleeve or inner cover sewn or otherwise fastened, secured or affixed inside the cover 30), without the fastening element(s) assembled thereon.

With the described embodiments, the present lumbar support device can utilize various fastening elements which externally fasten the lumbar support device to the seating apparatus. The present lumbar support device can also be utilized for various seating apparatuses, such as home or office chairs, train or airplane seats, etc. Thus, the user can easily move, take or transport the lumbar support device, and use the lumbar support device in their home, car, office, etc. without having to purchase or install the device separately for each seating apparatus.

CONCLUSION/SUMMARY

It is apparent from the above-described teachings and principles that the lumbar support device according to the present invention provides a back supporting device that is relatively simple in its structure, thus lowering manufacturing costs, that is portable to different seating apparatuses as desired, that is easy to install and maintain, while providing efficient back support.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many modifications and variations of the present disclosure are possible in light of the above teachings. It is intended that the scope of the invention be defined by the Claims appended hereto and their equivalents.

What is claimed is:

1. A back support device, comprising:

a) a bag comprising at least one compartment holding a predetermined volume of fluid or gas therein;

b) a cover securely encasing the bag, wherein the cover comprises a belt at one end, extending away from a location of the bag, and an insert portion at an opposite end of the cover from the one end; and c) fastening elements secured, affixed or fastened to the cover, the fastening elements being configured to fasten the back support device to a seating apparatus and comprising (i) a buckle configured to receive and/or engage the belt, comprising a securing arm configured to fasten the belt thereto and a plurality of spaced-apart through holes, and (ii) a rod in the insert portion of the cover, whereby the fluid or gas in the bag moves in multiple directions upon application of pressure to the back support device.

2. The back support device according to claim 1, wherein the predetermined volume of the fluid or gas is less than a maximum volume of the bag.

3. The back support device according to claim 2, wherein the predetermined volume of the fluid or gas is from 500 cc to 3000 cc.

4. The back support device according to claim 1, wherein the fluid or gas comprises oxygen gas or nitrogen gas.

5. The back support device according to claim 1, wherein the fluid or gas comprises air.

6. The back support device according to claim 1, wherein the fluid or gas comprises water or silicone.

7. The back support device according to claim 1, wherein the cover comprises one or more flexible natural or synthetic materials.

8. The back support device according to claim 7, wherein the flexible natural or synthetic materials are selected from the group consisting of fabric, genuine leather, artificial leather, rubber, and vinyl.

9. The back support device according to claim 1, wherein the fastening elements comprise at least one adjustable strap, each adjustable strap being fitted with a buckle, fastener or stopper configured to adjust a length of the adjustable strap.

10. The back support device according to claim 9, wherein the bag has dimensions of 306 mm wide and 411 mm long.

11. The back support device according to claim 9, wherein the bag has a nominal thickness of from 20 mm to 75 mm.

12. The back support device according to claim 1, wherein the fastening elements comprise first and second adjustable straps, the first adjustable strap being attached, affixed, secured or fastened to an upper section of the cover and having one of a male or female clip lock thereon; and the second adjustable strap being attached, affixed, secured or fastened to a lower section of the cover and having the other of the male or female clip lock thereon, permitting coupling with the male or female clip lock on the first adjustable strap.

13. The back support device according to claim 1, wherein the bag has a width of from 200 to 400 mm and a length of from 200 to 600 mm.

14. The back support device according to claim 1, configured to support a lumbar region of a person's back when the back support device is fastened to the seating apparatus.

15. The back support device according to claim 1, wherein a distance between adjacent through holes and a diameter of the through holes corresponds to a distance and a diameter of pins or posts of a removable headrest of the seating apparatus.

16. A back support device, comprising:

a) a bag comprising at least one compartment holding a predetermined volume of fluid or gas therein;

b) a cover securely encasing the bag; and c) fastening elements secured, affixed or fastened to the cover, wherein the fastening elements are configured to fasten the back support device to a seating apparatus and comprise at least one adjustable strap, an insert portion at an end of the cover, and a rod adapted to be placed in the insert portion, whereby the fluid or gas in the bag moves in multiple directions upon application of pressure to the back support device.

17. The back support device according to claim 16, wherein the cover comprises a belt at one end, extending away from a location of the bag, and an insert portion at an opposite end of the cover from the one end.

18. The back support device according to claim 17, wherein the fastening elements comprise (i) a buckle configured to receive and/or engage the belt and (ii) a rod in the insert portion of the cover.

19. The back support device according to claim 18, wherein the buckle comprises a securing arm configured to fasten the belt thereto; and a plurality of spaced-apart through holes.

20. The back support device according to claim 19, wherein a distance between adjacent through holes and a diameter of the through holes corresponds to a distance and a diameter of pins or posts of a removable headrest of the seating apparatus.

21. The back support device according to claim 19, wherein a distance between adjacent through holes and a diameter of the through holes are adapted to allow fitting the buckle to or securing the buckle with a removable headrest of the seating apparatus.

22. The back support device according to claim 16, wherein the predetermined volume of the fluid or gas is less than a maximum volume of the bag, and the fluid or gas comprises oxygen gas, nitrogen gas or air.

* * * * *